United States Patent
Park et al.

(10) Patent No.: US 10,019,299 B2
(45) Date of Patent: Jul. 10, 2018

(54) V2X COMMUNICATION APPARATUS FOR VERIFYING RELIABILITY OF V2X DATA, SYSTEM INCLUDING THE V2X COMMUNICATION APPARATUS, AND METHOD FOR VERIFYING RELIABILITY OF V2X DATA

(71) Applicant: HYUNDAI MOTOR COMPANY, Seoul (KR)

(72) Inventors: Jong Rok Park, Seoul (KR); Dong Gyu Noh, Dongducheon-si (KR); Su Lyun Sung, Anyang-si (KR); Tae Jun Lee, Gwangmyeong-si (KR); Cho Rong Ryu, Incheon (KR); Hahk Rel Noh, Bucheon-si (KR); Dae Sung Hwang, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/359,955

(22) Filed: Nov. 23, 2016

(65) Prior Publication Data

US 2018/0107532 A1    Apr. 19, 2018

(30) Foreign Application Priority Data

Oct. 17, 2016    (KR) .......................... 10-2016-0134591

(51) Int. Cl.
*H04W 4/44*       (2018.01)
*H04L 29/08*      (2006.01)
(Continued)

(52) U.S. Cl.
CPC ............ *G06F 11/008* (2013.01); *B60W 30/12* (2013.01); *G08G 1/163* (2013.01); *B60W 2520/10* (2013.01); *B60W 2550/308* (2013.01)

(58) Field of Classification Search
CPC ...... G06F 11/008; G08G 1/163; G08G 1/161; B60W 30/12; B60W 2550/308; B60W 2550/408; B60W 2520/10
See application file for complete search history.

(56) References Cited

U.S. PATENT DOCUMENTS 8,884,782 B2 * 11/2014 Rubin ..................... G08G 9/02
                                                        340/435
2011/0060524 A1    3/2011 Miyajima et al.
(Continued)

FOREIGN PATENT DOCUMENTS

GB          2536846 A         9/2016
KR          10-1231534 B1     2/2013

OTHER PUBLICATIONS

Office Action for corresponding Korean Patent Application No. 10-2016-0134591, dated Aug. 11, 2017.
(Continued)

*Primary Examiner* — Michael J Zanelli
(74) *Attorney, Agent, or Firm* — McDermott Will & Emery LLP

(57) ABSTRACT

A V2X communication apparatus includes a message transceiver for receiving a V2X communication message and transmitting V2X data to an apparatus in a vehicle, a parameter calculator for calculating a reliability verification parameter for verifying reliability of the V2X data, a reliability level decider for deciding a reliability level by comparing the reliability verification parameter with a predetermined reference value, and a message generator for generating the V2X data using the V2X communication message and generating the V2X data including the decided reliability level.

16 Claims, 5 Drawing Sheets

(51) Int. Cl.
*H04W 4/46* (2018.01)
*B60W 30/12* (2006.01)
*G06F 11/00* (2006.01)
*G08G 1/16* (2006.01)

(56) References Cited

U.S. PATENT DOCUMENTS

| | | |
|---|---|---|
| 2013/0083679 A1 | 4/2013 | Krishnaswamy et al. |
| 2013/0093618 A1 | 4/2013 | Oh et al. |
| 2014/0020098 A1 | 1/2014 | Stahlin |
| 2015/0051780 A1* | 2/2015 | Hahne ............... B60W 30/09 701/23 |
| 2015/0200957 A1* | 7/2015 | Zhang ............... B60W 30/09 726/22 |
| 2015/0271185 A1* | 9/2015 | Rommele ............ H04L 63/12 713/176 |
| 2016/0341557 A1 | 11/2016 | Kondo et al. |
| 2017/0025017 A1* | 1/2017 | Thomas ............ G06K 9/00798 |

OTHER PUBLICATIONS

European Search Report issued in corresponding European Patent Application No. 16201430.2-1853, dated Jun. 7, 2017.

\* cited by examiner

V2X COMMUNICATION APPARATUS FOR VERIFYING RELIABILITY OF V2X DATA, SYSTEM INCLUDING THE V2X COMMUNICATION APPARATUS, AND METHOD FOR VERIFYING RELIABILITY OF V2X DATA

CROSS-REFERENCE TO RELATED APPLICATION

This application claims the benefit of priority to Korean Patent Application No. 10-2016-0134591, filed on Oct. 17, 2016 with the Korean Intellectual Property Office, the disclosure of which is incorporated herein in its entirety by reference.

TECHNICAL FIELD

The present disclosure relates to a V2X communication apparatus for verifying reliability of V2X data, a system including the V2X communication apparatus, and a method for verifying reliability of V2X data, and more particularly, to a technology for verifying reliability of V2X data on the basis of standard parameters.

BACKGROUND

A V2X communication system is a system for performing vehicle to vehicle (V2V) communication or vehicle to infra (V2I) communication through communication terminals mounted in vehicles. According to the V2X communication system, one vehicle transmits and receives infrastructure and information to and from another vehicle to prevent a traffic incident.

Therefore, recently, various governments have investigated mandatory laws regarding mounting communication terminals enabling V2V communication, and attempts to implement the V2X communication system have been actively conducted in the U.S. and the Europe.

Terms and necessary requirements for V2X have been defined by the Institute of Electrical and Electronics Engineers (IEEE), Society of Automotive Engineers (SAE), International Organization for Standardization (ISO), or the like, and the Telecommunications Technology Association (TTA) has conducted standardization work based on international standards in Korea.

V2X data provided through the V2X communication is provided in connection with an advanced driver assistance system (ADAS), a self-driving system, and the like, in a vehicle along with the V2X communication system. Therefore, verification of reliability of the V2X data is required.

SUMMARY

The present disclosure has been made to solve the above-mentioned problems occurring in the prior art while advantages achieved by the prior art are maintained intact.

An aspect of the present disclosure provides a V2X communication apparatus for verifying reliability of V2X data, a system including the same, and a method for verifying reliability of V2X data capable of calculating a reliability level of V2X data depending on a system level (guidance/warning/control) on the basis of standard parameters for a vehicle application and providing the V2X data including the reliability level to an apparatus in a vehicle.

Objects of the present disclosure are not limited to the above-mentioned objects. That is, other objects that are not mentioned may be obviously understood by those skilled in the art from the following description.

According to an exemplary embodiment of the present disclosure, a V2X communication apparatus includes: a message transceiver receiving a V2X communication message and transmitting V2X data to an apparatus in a vehicle; a parameter calculator calculating a reliability verification parameter for verifying reliability of the V2X data; a reliability level decider deciding a reliability level by comparing the reliability verification parameter with a predetermined reference value; and a message generator generating the V2X data using the V2X communication message and generating the V2X data including the decided reliability level.

The reliability level decider may set the reliability level to a first reliability level corresponding to a guidance level, a second reliability level corresponding to a warning level, or a third reliability level corresponding to a control level.

The reliability level decider may set reliability of the first reliability level to be lowest, and sets reliability of the third reliability level to be highest.

The reliability verification parameter may include one or more of an information age (IA) parameter, a communication induced tracking error (CITE) parameter, and a security parameter.

The reliability level decider may decide reliability levels of each of the IA parameter, the CITE parameter, and the security parameter, and decide that a lowest reliability level of the respective reliability levels decided for each parameter is a final reliability level.

The reliability level decider may check whether or not the IA parameter exceeds a first reference value based on the first reliability level, a second reference value based on the second reliability level, and a third reference value based on the third reliability level that are predetermined to decide the reliability level of the IA parameter.

The reliability level decider may set the first reference value of the first to third reference values to be highest, and set the third reference value of the first to third reference values to be lowest.

The reliability level decider may set the first to third reference values on the basis of a speed of the vehicle and a distance between the vehicle and a surrounding vehicle.

The reliability level decider may set the first to third reference values to become small as the speed of the vehicle becomes low and the distance between the vehicle and the surrounding vehicle becomes distant.

The reliability level decider may check whether or not the CITE parameter exceeds a fourth reference value based on the first reliability level, a fifth reference value based on the second reliability level, and a sixth reference value based on the third reliability level that are predetermined to decide the reliability level of the CITE parameter.

The reliability level decider may set the sixth reference value for deciding the third reliability level using a sensor fusion error (SFE).

The reliability level decider may check whether or not the security parameter exceeds a seventh reference value based on the first reliability level and an eighth reference value based on the second reliability level and the third reliability level that are predetermined to decide the reliability level of the security parameter.

The reliability level decider may compare a difference value between a certification received time and a current time with the seventh reference value and the eight reference value to decide the reliability level of the security parameter.

The reliability level decider may check whether or not a surrounding vehicle transmitting a V2X communication message is included in a certificate revocation list in the case in which the message transceiver receives the V2X communication message from the surrounding vehicle, and may not perform reliability decision in the case in which the surrounding vehicle is included in the certificate revocation list.

According to another exemplary embodiment of the present disclosure, a V2X communication system includes: a V2X communication apparatus generating V2X data on the basis of a V2X communication message when the V2X communication apparatus generating V2X receives the V2X communication message from a surrounding vehicle, deciding a reliability level for the V2X data, and transmitting the V2X data including the decided reliability level to an apparatus in a vehicle; and a plurality of vehicle apparatuses performing at least one of vehicle guidance, warning, and control by determining whether or not the V2X data are used by checking the reliability level of the V2X data when the plurality of vehicle apparatuses receive the transmitted V2X data.

The plurality of vehicle apparatuses may be one or more of a smart cruise control (SCC), a navigation apparatus, a lane departure warning system (LDWS), a parking assistance system, a lane keeping assist system (LKAS), and an advanced driving assistance system (ADAS).

The V2X communication apparatus may include: a message transceiver receiving the V2X communication message and transmitting the V2X data to the apparatus in the vehicle; a parameter calculator calculating a reliability verification parameter for verifying reliability of the V2X data; a reliability level decider deciding the reliability level by comparing the reliability verification parameter with a predetermined reference value; and a message generator generating the V2X data using the V2X communication message and generating the V2X data including the decided reliability level.

The reliability level decider may set the reliability level to a first reliability level corresponding to a guidance level, a second reliability level corresponding to a warning level, or a third reliability level corresponding to a control level.

According to still another exemplary embodiment of the present disclosure, a method for verifying reliability of V2X data includes: receiving a V2X communication message from a surrounding vehicle; calculating a reliability verification parameter for verifying the reliability of the V2X data generated on the basis of the V2X communication message;

deciding a reliability level by comparing the reliability verification parameter with a predetermined reference value; and allowing the decided reliability level to be included in the V2X data and transmitting the V2X data including the decided reliability level to an apparatus in a vehicle.

In the deciding of the reliability level, the reliability level may be decided to be one of a first reliability level corresponding to is a guidance level, a second reliability level corresponding to a warning level, and a third reliability level corresponding to a control level.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
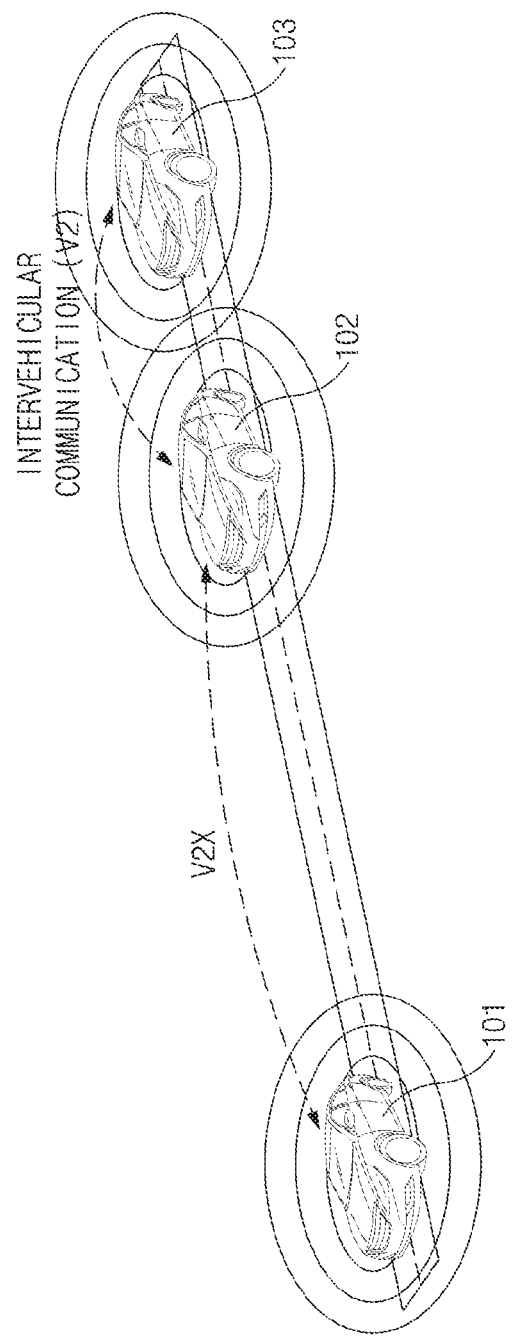
FIG. 1 is a view illustrating a configuration of an intervehicular V2X communication network according to exemplary embodiments of the present disclosure.

Hereinafter, exemplary embodiments of the present disclosure will be described in detail with reference to the accompanying drawings. It is to be noted that the same components will be denoted by the same reference numerals even though they are illustrated in different drawings. Further, in describing exemplary embodiments of the present disclosure, well-known constructions or functions will not be described in detail in the case in which it is decided that they may unnecessarily obscure the understanding of exemplary embodiments of the present disclosure.

Terms 'first', 'second', A, B, (a), (b), and the like, will be used in describing components of exemplary embodiments of the present disclosure. These terms are used only in order to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present disclosure pertains. It should be interpreted that terms defined by a generally used dictionary are identical with the meanings within the context of the related art, and they should not be ideally or excessively formally interpreted unless the context clearly dictates otherwise.

Hereinafter, exemplary embodiments of the present disclosure will be described in detail with reference to FIGS. 1 to 5.

FIG. 1 is a view illustrating a configuration of an intervehicular V2X communication network according to exemplary embodiments of the present disclosure.

An example of V2X communication among vehicles 101, 102 and 103 is illustrated in FIG. 1.

V2X communication in the present disclosure means all of V2I communication corresponding to communication between a vehicle and a traffic signal apparatus, V2N communication corresponding to communication between a vehicle and a user terminal, V2V communication corresponding to communication between vehicles, and the like.

In this case, for the purpose of communication among the vehicles, the vehicles are identified through certificates provided to the respective vehicles. The certificates of the respective vehicles may be not only provided to each vehicle, but may also be stored and managed in a database of a separate sever. In addition, the respective vehicles may store and manage certificate revocation lists (CRLs) therein. In addition, the respective vehicles generate V2X date on the basis of V2X communication messages received from other vehicles, and provide the V2X data to apparatuses in the vehicles. In the present disclosure, the V2X communication messages include communication messages wirelessly transmitted and received among the vehicles, and the V2X data includes data transmitted and received between V2X communication apparatuses in the vehicles and other apparatuses in the vehicles.

Figure 2:
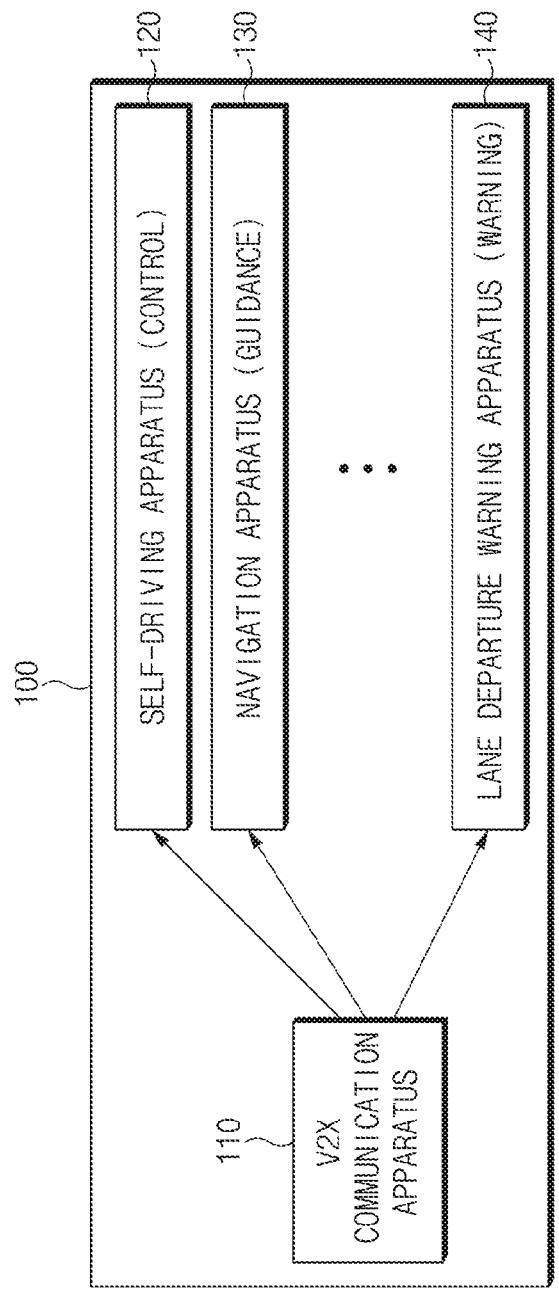
FIG. 2 is a block diagram illustrating a V2X communication system according to exemplary embodiments of the present disclosure.

FIG. 2 is a block diagram illustrating a V2X communication system according to exemplary embodiments of the present disclosure.

Referring to FIG. 2, the V2X communication system 100 may include a self-driving apparatus 120, a navigation apparatus 130, a lane departure warning apparatus 140, and the like, as other apparatuses receiving V2X data from a V2X communication apparatus 110.

When the V2X communication apparatus 110 receives a V2X communication message from an external vehicle, the V2X communication apparatus 110 generates the V2X data to be transmitted to apparatuses in a vehicle on the basis of the V2X communication message, calculates reliability of the V2X data, and transmits the V2X data including reliability levels to the self-driving apparatus 120, the navigation apparatus 130, the lane departure warning apparatus 140, and the like, corresponding to other apparatuses in the vehicle. In this case, although an example in which the reliability of the V2X data transmitted to other apparatuses in the vehicle is calculated and the V2X data including the reliability levels are transmitted is described in the present disclosure, the reliability levels may be included in a V2X communication message transmitted to the external vehicle, and the V2X communication message including the reliability levels may be transmitted.

The V2X communication apparatus 110 sets the reliability levels to a first reliability level corresponding to a guidance level, a second reliability level corresponding to a warning level, or a third reliability level corresponding to a control level, sets reference values for each reliability level, and checks whether or not an information age (IA) parameter, a communication induced tracking error (CITE) parameter, and a security parameter exceed predetermined reference values for each reliability level to decide the reliability levels.

In addition, the V2X communication apparatus 110 allows the decided reliability levels to be included in the V2X data, and transmits V2X data including the reliability levels to other apparatuses 120, 130 and 140.

Although the self-driving apparatus 120, the navigation apparatus 130, and the lane departure warning apparatus 140 are illustrated as examples of other apparatuses in FIG. 2, other apparatuses are not limited thereto, but may include all vehicle apparatuses each performing guidance, warning and control of the vehicle. For example, other apparatuses may include a navigation apparatus as a vehicle apparatus performing the guidance, a smart cruise control (SCC), a smart parking assistance system (SPAS), a lane keeping assist system (LKAS), an advanced driving assistance system (ADAS), an advanced SCC (ASCC), an autonomous emergency braking (AEB), and the like, as a vehicle apparatus performing the control, and a lane departure warning system (LDWS), a blind spot detection (BSD), and the like, as a vehicle apparatus performing the warning.

When these other apparatuses 120, 130 and 140 receive the V2X data transmitted by the V2X communication apparatus 110, they check the reliability levels included in the V2X data to check whether or not the reliability levels are appropriate for functions performed by them, thereby making it possible to decide whether or not to use the corresponding V2X data. For example, in the case in which the reliability levels are divided into the guidance level, the warning level and the control level, the control level is set to a level having the highest reliability, and the guidance level is set to a level having the lowest reliability. Therefore, in the case in which the self-driving apparatus 120 performing the control receives V2X including the guidance level having the low reliability, the self-driving apparatus 120 decides that it does not use the corresponding V2X data. That is, since a control error generated in the vehicle apparatus performing the control is directly associated with a risk of a driver, the vehicle apparatus performing the control uses only V2X data having a reliability higher that of the guidance or the warning, thereby making it possible to reduce the risk.

Figure 3:
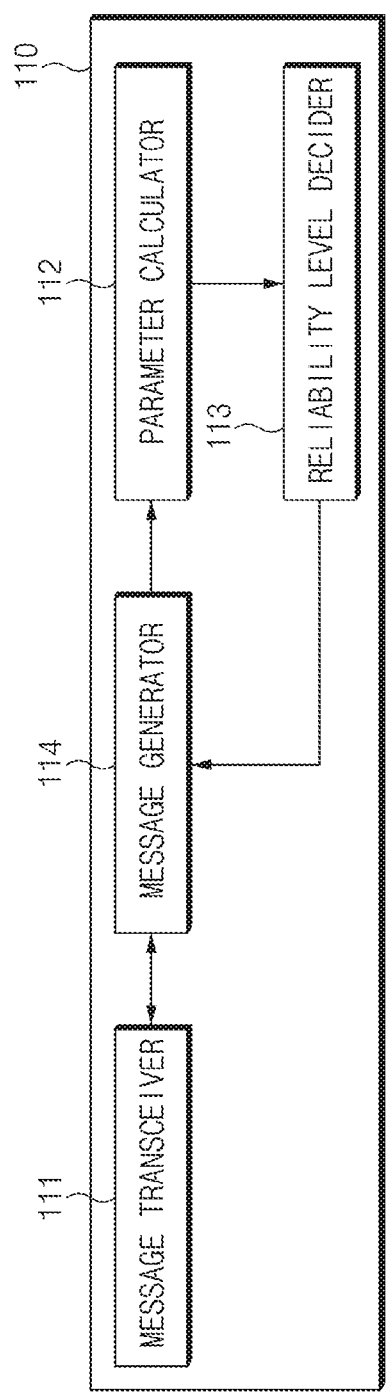
FIG. 3 is a block diagram illustrating a V2X communication apparatus according to exemplary embodiments of the present disclosure.

Hereinafter, detailed components and functions of the V2X communication apparatus according to exemplary embodiments of the present disclosure will be described in detail with reference to FIG. 3.

The V2X communication apparatus 110 includes a message transceiver 111, a parameter calculator 112, a reliability level decider 113 and a message generator 114.

The message transceiver 111 receives a V2X communication message from the surrounding vehicle, and transmits V2X data generated on the basis of the V2X communication message in the message generator 114 and including reliability levels to other apparatuses 120, 130 and 140.

The message generator 114 generates the V2X data on the basis of the V2X communication message, and generates the V2X data including reliability levels decided in the reliability level decider 113.

The parameter calculator 112 calculates reliability verification parameters corresponding to standard parameters for verifying reliability of the V2X data. In this case, the reliability verification parameters may include an IA parameter, a CITE parameter and a security parameter.

J2945 defined by the Society of Automotive Engineers (SAE) suggests minimum requirements and verification standards required in a V2X communication application, parameters for measuring a communication situation when a vehicle communicates with the surrounding vehicle are defined in the J2945 standard, and threshold parameters for quality of V2X data used in an ADAS of a control level are defined in the North America CAMP project. In the present disclosure, the CITE parameter and the security parameter in the J2945 standard, and the IA parameter in the North America CAMP project are used.

The parameter calculator 112 calculates the IA parameter using an inter-packet gap corresponding to an interval between recently received packets, a current time, and a last package received time. The parameter calculator 112 calculates an error on the basis of a position estimated value of the vehicle and a current position value of the vehicle to calculate the CITE parameter. In addition, the parameter calculator 112 calculates the security parameter using a critical event condition (CEC). Since a method for calculating the reliability verification parameters by the parameter calculator 112 is described in the J2945 standard and the standards in the North America CAMP project, or the like, a detailed description therefor will be omitted.

The reliability level decider 113 decides reliability levels for the corresponding V2X data by deciding whether or not the respective reliability verification parameters satisfy predetermined reference values.

The reliability level decider 113 sets the reliability levels to a first reliability level corresponding to a guidance level, a second reliability level corresponding to a warning level, or a third reliability level corresponding to a control level, and sets the first reliability level to the lowest level and sets the third reliability level to the highest level. That is, reliability of the control level is set to be highest, reliability of the guidance level is set to be lowest and reliability of the warning level is set to be intermediate.

In this case, the reliability level decider 113 decides reliability levels of each of the IA parameter, the CITE parameter, and the security parameter, and decides that the lowest level of the respective reliability levels decided for each parameter is a final reliability level. For example, in the case in which all of the respective parameters are the control level as a decision result of the reliability levels for each parameter, the reliability level decider 113 decides that the control level is a final reliability level. However, in the case in which a reliability level of the IA parameter is the guidance level and reliability levels of the CITE parameter and the security parameter are the control level, the reliability level decider 113 decides that the guide level corresponding to the lowest reliability level of the three reliability levels is a final reliability level.

Then, the reliability level decider 113 sets reference values for the respective parameters in order to decide reliability of the respective parameters, and compares the reference values and the respective parameters with each other to decide the reliability levels.

TABLE 1

| Reliability Level | IA | CITE | Security |
|---|---|---|---|
| Fail | IA >1000 ms | CITE >0.65 m | Whether or not Certificate Revocation List (CRL) is included |
| New Guidance | IA <650 ms<br>IA < IA$_{TH1}$<br>IA$_{TH1}$ = 0.7 * D$_{hv-rv}$/HV$_v$ | CITE <0.65 m<br>CITE <0.6 m | Current Time − Last Certificate Rx Time < TH$_{sec1}$<br>※ TH$_{sec1}$: default 10 min |
| Warning | IA < I$_{ATH2}$<br>I$_{ATH2}$ = 0.6 * Dh$_{v-rv}$/HV$_v$ | CITE <0.55 m | Current Time − Last Certificate Rx Time < TH$_{sec2}$<br>※ TH$_{sec2}$: default 5 min |
| Control | IA < I$_{ATH2}$<br>I$_{ATH2}$ = 0.5 * Dh$_{v-rv}$/HV$_v$ | CITE <0.5 m<br>&&<br>SFE(Sensor Fusion Error) <0.5 m | |

The above Table 1 represents reliability decision references of the respective parameters for each reliability level.

First, in the case in which a value of the IA parameter calculated in the parameter calculator 112 exceeds 1000 ms, in the case in which the CITE parameter exceeds 0.65 m, and in the case in which a vehicle transmitting a V2X communication message corresponding to V2X data corresponding to a reliability decision target is present in a certificate revocation list (CRL), the reliability level decider 113 does not perform a reliability decision of the V2X data corresponding to the reliability decision target.

That, is, the reliability level decider 113 performs a reliability level decision in the case in which a value of the IA parameter is less than 1000 ms, in the case in which the CITE parameter is less than 0.65 m, and in the case in which the vehicle transmitting the V2X communication message corresponding to the V2X data corresponding to the reliability decision target is not present in the CRL.

The reliability level decider 113 checks whether or not the IA parameter exceeds a first reference value IA$_{TH1}$, whether or not the IA parameter exceeds a second reference value IA$_{TH2}$, and whether or not the IA parameter exceeds a third reference value IA$_{TH3}$, and decides that the reliability level of the IA parameter is the guidance level when the IA parameter is less than the first reference value IA$_{TH1}$, decides that the reliability level of the IA parameter is the warning level when the IA parameter is less than the second reference value IA$_{TH2}$, and decides that the reliability level of the IA parameter is the control level when the IA parameter is less than the third reference value IA$_{TH3}$.

In this case, each of the first reference value IA$_{TH1}$, the second reference value IA$_{TH2}$ and the third reference value IA$_{TH3}$ may be set on the basis of a speed of the vehicle and a relative distance between the vehicle and the surrounding vehicle. As the speed of the vehicle becomes low and the relative distance between the vehicle and the surrounding vehicle becomes distant, the first to third reference values may decrease.

In this case, the first reference value IA$_{TH1}$, the second reference value IA$_{TH2}$ and the third reference value IA$_{TH3}$ may be calculated by the following Equations 1 to 3:

$$IA_{TH1} = 0.7 * D_{hv-rv}/HV_v \quad \text{[Equation 1]}$$

$$IA_{TH2} = 0.6 * D_{hv-rv}/HV_V \quad \text{[Equation 2]}$$

$$IA_{TH2} = 0.5 * D_{hv-rv}/HV_v. \quad \text{[Equation 3]}$$

In the above Equations 1 to 3, $D_{hv-rv}$ indicates the relative distance between the vehicle and the surrounding vehicle, and $HV_v$ indicates the speed of the vehicle.

In addition, the reliability level decider 113 checks whether or not the CITE parameter exceeds a fourth reference value (0.6 m), whether or not the CITE parameter exceeds a fifth reference value (0.55 m), and whether or not the CITE parameter exceeds a sixth reference value (0.5 m) or a sensor fusion error (SFE) exceeds 0.5 m, and decides that the reliability level of the CITE parameter is the guidance level when the CITE parameter is less than the fourth reference value, decides that the reliability level of the CITE parameter is the warning level when the CITE parameter is less than the fifth reference value, and decides that the reliability level of the CITE parameter is the control level when the CITE parameter is less than the sixth reference value. In this case, the fourth to sixth reference values may be set on the basis of a width of a lane, and may be set to be different from each other depending on a situation.

The reliability level decider 113 checks whether or not the security parameter exceeds a seventh reference value TH$_{sec1}$ based on the first reliability level and whether or not the security parameter exceeds an eighth reference value TH$_{sec2}$ based on the second reliability level and the third reliability level, and decides that the reliability level of the security parameter is the guidance level when the security parameter is less than the seventh reference value and decides the reliability level of the security parameter is the warning or control level when the security parameter is less than the eighth reference value. In this case, the seventh reference value TH$_{sec1}$ may be set to ten minutes, and the eighth reference value TH$_{sec2}$ may be set to five minutes. In this case, the five minutes are values set on the basis of a security standard.

The message generator 114 generates the V2X data to be transmitted to the apparatuses in the vehicle on the basis of the V2X communication message, and generates the V2X data including the reliability levels decided in the reliability level decider 113.

Figure 4:
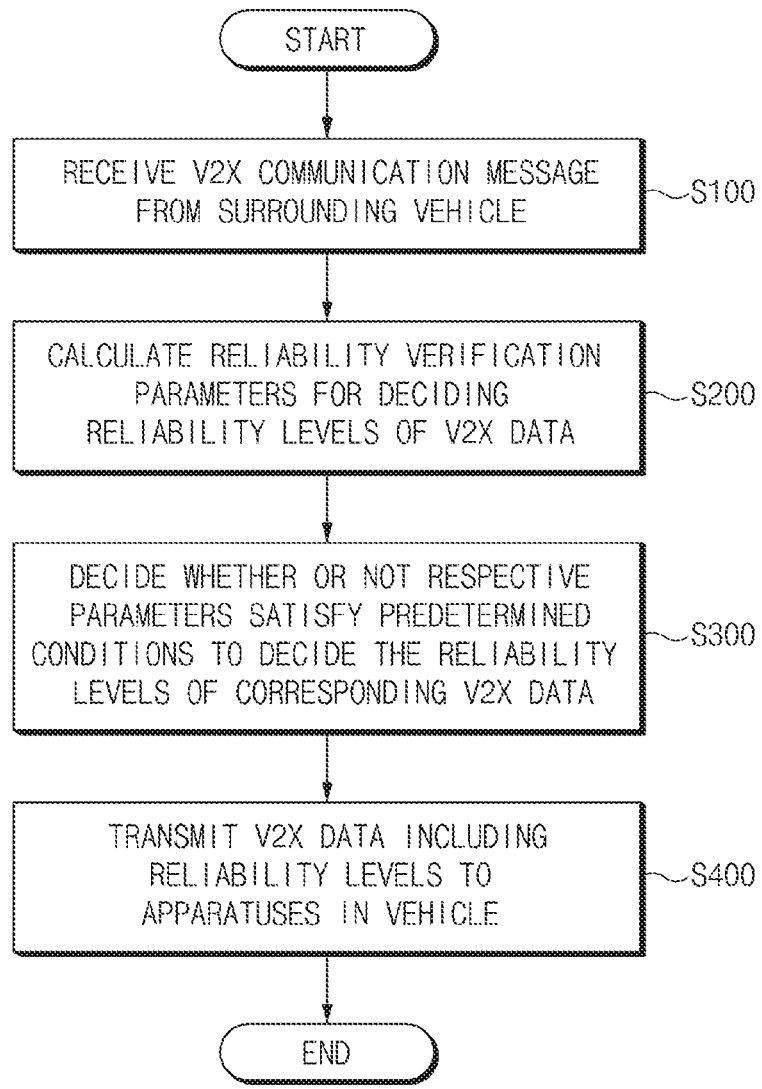
FIG. 4 is a flow chart illustrating a method for verifying reliability of V2X data according to exemplary embodiments of the present disclosure.

Hereinafter, a method for verifying reliability of V2X data according to an exemplary embodiment of the present disclosure will be described with reference to FIG. 4.

First, the V2X communication apparatus 110 receives the V2X communication message from the surrounding vehicle (S100). In this case, the V2X communication apparatus 110 may also receive the V2X communication message from the surrounding traffic signal apparatus, or the like, rather than from the surrounding vehicle.

The V2X communication apparatus 110 calculates the reliability verification parameters for deciding the reliability levels using the V2X data included in the V2X communication message (S200). In this case, the reliability verification parameters may include the CITE parameter and the security parameter corresponding to upper parameters defined in the J2945 standard, and the IA parameter corresponding to an upper parameter defined in the North America CAMP project.

Then, the V2X communication apparatus 110 decides whether or not the reliability verification parameters satisfy predetermined reference values, respectively, to decide the reliability levels of the corresponding V2X data (S300).

In this case, the V2X communication apparatus 110 does not perform a reliability decision of the V2X data corresponding to the reliability decision target, in the case in which a value of the IA parameter exceeds 1000 ms, in the case in which the CITE parameter exceeds 0.65 m, and in the case in which a vehicle transmitting the V2X communication message corresponding to V2X data corresponding to a reliability decision target is present in the CRL.

The V2X communication apparatus 110 performs a reliability level decision in the case in which a value of the IA parameter is less than 1000 ms, in the case in which the CITE parameter is less than 0.65 m, and in the case in which the vehicle transmitting the V2X communication message corresponding to the V2X data corresponding to the reliability decision target is not present in the CRL.

The V2X communication apparatus 110 checks whether or not the IA parameter exceeds the first reference value $IA_{TH1}$, whether or not the IA parameter exceeds the second reference value $IA_{TH2}$, and whether or not the IA parameter exceeds the third reference value $IA_{TH3}$. The V2X communication apparatus 110 then decides that the reliability level of the IA parameter is the guidance level when the IA parameter is less than the first reference value $IA_{TH1}$, decides that the reliability level of the IA parameter is the warning level when the IA parameter is less than the second reference value $IA_{TH2}$, and decides that the reliability level of the IA parameter is the control level when the IA parameter is less than the third reference value $IA_{TH3}$.

In addition, the V2X communication apparatus 110 checks whether or not the CITE parameter exceeds the fourth reference value (0.6 m), whether or not the CITE parameter exceeds the fifth reference value (0.55 m), and whether or not the CITE parameter exceeds the sixth reference value (0.5 m) or the SFE exceeds 0.5 m, and decides that the reliability level of the CITE parameter is the guidance level when the CITE parameter is less than the fourth reference value, decides that the reliability level of the CITE parameter is the warning level when the CITE parameter is less than the fifth reference value, and decides that the reliability level of the CITE parameter is the control level when the CITE parameter is less than the sixth reference value.

The V2X communication apparatus 110 checks whether or not the security parameter exceeds the seventh reference value $TH_{sec1}$ and whether or not the security parameter exceeds the eighth reference value $TH_{sec2}$, and decides that the reliability level of the security parameter is the guidance level when the security parameter is less than the seventh reference value and decides the reliability level of the security parameter is the warning or control level when the security parameter is less than the eighth reference value.

Then, the V2X communication apparatus 110 generates the V2X data including the decided reliability levels, and then transmits the generated V2X data (S400).

In the present disclosure, the reliability levels of the V2X data depending on system levels (the guidance, the warning, and the control) are calculated on the basis of congestion control/security related parameters, and the V2X data including the reliability levels are transmitted to the respective vehicle apparatuses using the guidance, the warning, and the control to allow the respective vehicle apparatuses to use only the V2X data having the reliability levels appropriate for the respective vehicle apparatuses, thereby making it possible to improve reliability of the respective vehicles.

In addition, the existing parameters defined in the standards are used as the reliability verification parameters. Therefore, separate parameters do not need to be used, such that a technology for verifying reliability of V2X data according to exemplary embodiments of the present disclosure may be easily applied and efficiency may be maximized.

Figure 5:
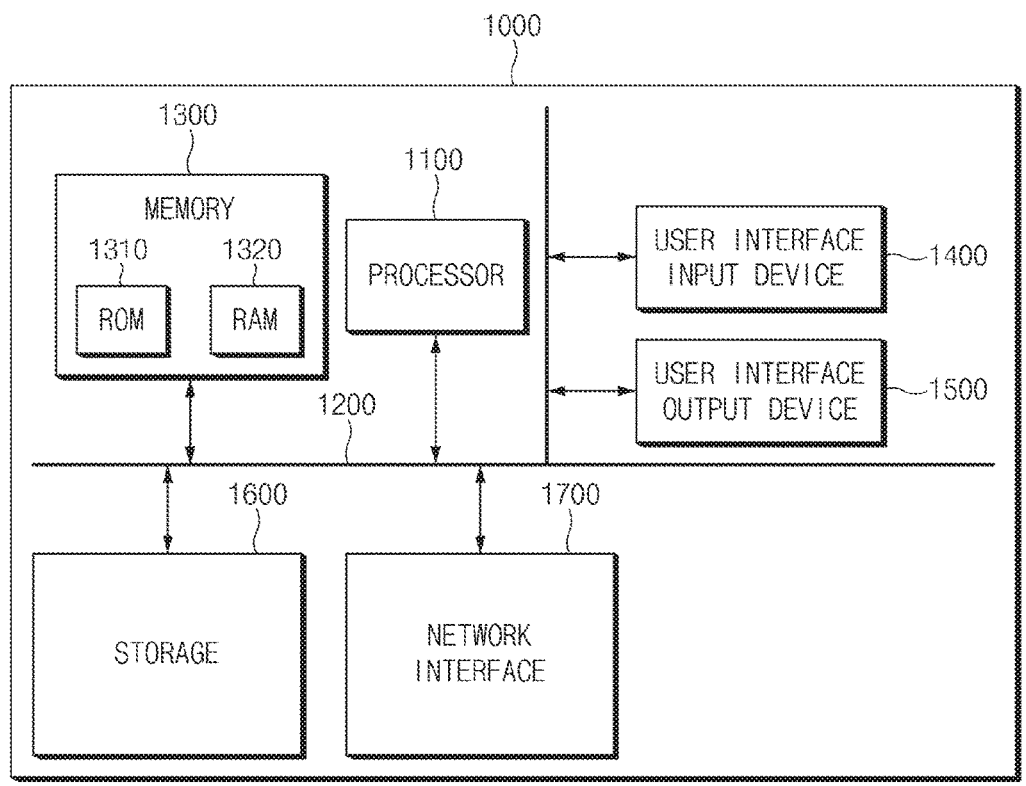
FIG. 5 is a block diagram illustrating a computer system to which a technology for verifying reliability of V2X data according to exemplary embodiments of the present disclosure is applied.

FIG. 5 is a block diagram illustrating a computer system to which a technology for verifying reliability of V2X data according to exemplary embodiments of the present disclosure is applied.

Referring to FIG. 5, the computer system 1000 includes, in some implementations, at least one processor 1100, a memory 1300, a user interface input device 1400, a user interface output device 1500, a storage 1600 and a network interface 1700 connected to each other through buses 1200.

The processor 1100 may be a semiconductor device for executing processing for instructions stored in a central processing unit (CPU) or the memory 1300 and/or the storage 1600. The memory 1300 and the storage 1600 may include various kinds of volatile or non-volatile storage media. For example, the memory 1300 may be a read only memory (ROM) and a random access memory (RAM).

Therefore, steps of a method or an algorithm described in association with exemplary embodiments disclosed in the present disclosure may be directly implemented by a hardware or software module executed by the processor 1100, or a combination thereof. The software module may reside in a random access memory (RAM), a flash memory, a read only memory (ROM), an erasable programming ROM (EPROM), an electrically erasable programming ROM (EEPROM), a register, a hard disk, a detachable disk or a storage medium such as a compact disk-ROM (CD-ROM) (that is, the memory 1300 and/or the storage 1600).

An illustrative storage medium may be coupled to the processor 1100, which may read information from the storage medium and write information to the storage medium. As another method, the storage medium and the processor 1100 may also be formed integrally with each other. The processor and the storage medium may also reside in an application specific integrated circuit (ASIC). The ASIC may also reside in a user terminal. As another method, the processor and the storage medium may also reside as individual components in the user terminal.

In the present technology, the reliability of the V2X data is decided at the time of V2X communication, thereby making it possible to increase reliability of a vehicle system using the V2X data.

In addition, in the present disclosure, the parameters provided in advance are used, thereby making it possible to conveniently decide the reliability of the V2X data without building a separate system of separate software.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A V2X communication apparatus comprising:
   a message transceiver for receiving a V2X communication message and transmitting V2X data to an apparatus in a vehicle;
   a parameter calculator for calculating a reliability verification parameter for verifying reliability of the V2X data;
   a reliability level decider for deciding a reliability level by comparing the reliability verification parameter with a predetermined reference value; and
   a message generator for generating the V2X data including the deciding reliability level using the V2X communication message
   wherein the reliability level decider sets the reliability level to a first reliability level corresponding to a guidance level, a second reliability level corresponding to a warning level, and a third reliability level corresponding to a control level, and
   wherein the reliability level decider sets reliability of the first reliability level to be lowest among the first, second and third reliability levels, and sets reliability of the third reliability level to be highest among the first, second and third reliability levels.

2. The V2X communication apparatus according to claim 1, wherein the reliability verification parameter includes one or more of an information age (IA) parameter, a communication induced tracking error (CITE) parameter and a security parameter.

3. The V2X communication apparatus according to claim 2, wherein the reliability level decider decides reliability levels of each of the IA parameter, the CITE parameter, and the security parameter, and decides that a lowest reliability level of the respective reliability levels decided for each parameter is a final reliability level.

4. The V2X communication apparatus according to claim 3, wherein the reliability level decider checks whether or not the IA parameter exceeds a first reference value based on the first reliability level, a second reference value based on the second reliability level, and a third reference value based on the third reliability level that are predetermined to decide the reliability level of the IA parameter.

5. The V2X communication apparatus according to claim 4, wherein the reliability level decider sets the first reference value of the first to third reference values to be highest among the first, second and third reliability levels, and sets the third reference value of the first to third reference values to be lowest among the first, second and third reliability levels.

6. The V2X communication apparatus according to claim 5, wherein the reliability level decider sets the first to third reference values on the basis of a speed of the vehicle and a distance between the vehicle and a surrounding vehicle.

7. The V2X communication apparatus according to claim 6, wherein the reliability level decider sets the first to third reference values to decrease as the speed of the vehicle decreases and the distance between the vehicle and the surrounding vehicle increases.

8. The V2X communication apparatus according to claim 4, wherein the reliability level decider checks whether or not the CITE parameter exceeds a fourth reference value based on the first reliability level, a fifth reference value based on the second reliability level, and a sixth reference value based on the third reliability level that are predetermined to decide the reliability level of the CITE parameter.

9. The V2X communication apparatus according to claim 8, wherein the reliability level decider sets the sixth reference value for deciding the third reliability level using a sensor fusion error (SFE).

10. The V2X communication apparatus according to claim 8, wherein the reliability level decider checks whether or not the security parameter exceeds a seventh reference value based on the first reliability level and an eighth reference value based on the second reliability level and the third reliability level that are predetermined to decide the reliability level of the security parameter.

11. The V2X communication apparatus according to claim 10, wherein the reliability level decider compares a difference value between a certification received time and a current time with the seventh reference value and the eight reference value to decide the reliability level of the security parameter.

12. The V2X communication apparatus according to claim 10, wherein the reliability level decider checks whether or not a surrounding vehicle transmitting a V2X communication message is included in a certificate revocation list in the case in which the message transceiver receives the V2X communication message from the surrounding vehicle, and does not perform reliability decision in the case in which the surrounding vehicle is included in the certificate revocation list.

13. A V2X communication system comprising:
    a V2X communication apparatus for generating V2X data on the basis of a V2X communication message when the V2X communication apparatus generating V2X data receives the V2X communication message from a surrounding vehicle, deciding a reliability level for the V2X data, and transmitting the V2X data including the decided reliability level to an apparatus in a vehicle; and
    a plurality of vehicle apparatuses for performing at least one of vehicle guidance, warning, and control by determining whether or not the V2X data are used by checking the reliability level of the V2X data when the plurality of vehicle apparatuses receive the transmitted V2X data,
    wherein the V2X communication apparatus sets the reliability level to a first reliability level corresponding to a guidance level, a second reliability level corresponding to a warning level, and a third reliability level corresponding to a control level, and
    wherein the V2X communication apparatus sets reliability of the first reliability level to be lowest among the first, second and third reliability levels, and sets reliability of the third reliability level to be highest among the first, second and third reliability levels.

14. The V2X communication system according to claim 13, wherein the plurality of vehicle apparatuses are one or more of a smart cruise control (SCC), a navigation apparatus, a lane departure warning system (LDWS), a parking assistance system, a lane keeping assist system (LKAS) and an advanced driving assistance system (ADAS).

15. The V2X communication system according to claim 13, wherein the V2X communication apparatus includes:

a message transceiver for receiving the V2X communication message and transmitting the V2X data to the apparatus in the vehicle;

a parameter calculator for calculating a reliability verification parameter for verifying reliability of the V2X data;

a reliability level decider for deciding the reliability level by comparing the reliability verification parameter with a predetermined reference value; and a message generator for generating the V2X data using the V2X communication message and generating the V2X data including the decided reliability level.

16. A method for verifying reliability of V2X data, comprising:

receiving a V2X communication message from a surrounding vehicle;

calculating a reliability verification parameter for verifying the reliability of the V2X data generated on the basis of the V2X communication message;

deciding a reliability level by comparing the reliability verification parameter with a predetermined reference value; and allowing the decided reliability level to be included in the V2X data and transmitting the V2X data including the decided reliability level to an apparatus in a vehicle, wherein in the step of deciding of the reliability level, the reliability level is decided to be one of a first reliability level corresponding to a guidance level, a second reliability level corresponding to a warning level, and a third reliability level corresponding to a control level, and wherein in the step of deciding of the reliability level, the reliability level is decided to be the first reliability level to be lowest among the first, second and third reliability levels, and sets reliability of the third reliability level to be highest among the first, second and third reliability levels.

* * * * *